US012539366B2

(12) United States Patent
Zeller et al.

(10) Patent No.: US 12,539,366 B2
(45) Date of Patent: Feb. 3, 2026

(54) INJECTION DEVICE WITH AN END-OF-DOSE INDICATOR

(71) Applicant: Becton Dickinson France, Le Pont de Claix (FR)

(72) Inventors: Benoit Zeller, Annecy le Vieux (FR); Gilles Bernede, Arbusigny (FR)

(73) Assignee: Becton Dickinson France, Le Pont de Claix (FR)

( * ) Notice: Subject to any disclaimer, the term of this patent is extended or adjusted under 35 U.S.C. 154(b) by 910 days.

(21) Appl. No.: 17/764,421

(22) PCT Filed: Oct. 14, 2020

(86) PCT No.: PCT/EP2020/078925
§ 371 (c)(1),
(2) Date: Mar. 28, 2022

(87) PCT Pub. No.: WO2021/078607
PCT Pub. Date: Apr. 29, 2021

(65) Prior Publication Data
US 2022/0347387 A1 Nov. 3, 2022

(30) Foreign Application Priority Data
Oct. 23, 2019 (EP) ..................................... 19315128

(51) Int. Cl.
*A61M 5/20* (2006.01)
*A61M 5/315* (2006.01)
*A61M 5/32* (2006.01)

(52) U.S. Cl.
CPC ............ *A61M 5/20* (2013.01); *A61M 5/3157* (2013.01); *A61M 5/3158* (2013.01);
(Continued)

(58) Field of Classification Search
CPC .. A61M 5/3157; A61M 5/3158; A61M 5/502; A61M 2005/3267; A61M 2205/583
See application file for complete search history.

(56) References Cited

U.S. PATENT DOCUMENTS 12,186,540 B2 * 1/2025 Kemp .................. A61M 5/3245
2003/0014018 A1 * 1/2003 Giambattista ....... A61M 5/3202
604/198
(Continued)

FOREIGN PATENT DOCUMENTS

CA 2808875 A1 9/2014
WO WO-02083205 A1 * 10/2002 ............ A61M 37/00
(Continued)

*Primary Examiner* — Michael J Tsai
*Assistant Examiner* — Forrest Blake Dipert
(74) *Attorney, Agent, or Firm* — The Webb Law Firm

(57) ABSTRACT

Provided is an injection device for injecting a substance, comprising a case receiving a barrel containing the substance to be injected and comprising a stopper movable inside the barrel, a plunger unit comprising a triggering portion, the plunger unit being coupled to the stopper and movable with regard to the case from an initial, proximal position to a final, distal position to inject the substance when the barrel is provided into the case, an end-of-dose indicator movable from a hidden position to a visible position in which at least one portion of the end-of-dose indicator is visible to a user, hiding means for locking the end-of-dose indicator in the hidden position and configured to be unlocked by the triggering portion of the plunger unit when the plunger unit reaches an indicator position.

15 Claims, 8 Drawing Sheets

(52) U.S. Cl.
CPC ..... *A61M 5/326* (2013.01); *A61M 2005/3247* (2013.01); *A61M 2005/3267* (2013.01); *A61M 2205/583* (2013.01)

(56) References Cited

U.S. PATENT DOCUMENTS

| | | | | |
|---|---|---|---|---|
| 2005/0113750 | A1* | 5/2005 | Targell | A61M 5/3272 |
| | | | | 604/110 |
| 2013/0204229 | A1 | 8/2013 | Olson et al. | |
| 2013/0338601 | A1 | 12/2013 | Cowe | |
| 2015/0290400 | A1* | 10/2015 | Roberts | A61M 5/3245 |
| | | | | 604/198 |
| 2021/0093789 | A1* | 4/2021 | Plambech | A61M 5/3157 |
| 2021/0093799 | A1* | 4/2021 | Perot | A61M 5/3271 |

FOREIGN PATENT DOCUMENTS

| | | | | |
|---|---|---|---|---|
| WO | WO-02083212 A1 * | 10/2002 | | A61M 37/00 |
| WO | 2019158549 A1 | 8/2019 | | |

\* cited by examiner

INJECTION DEVICE WITH AN END-OF-DOSE INDICATOR

CROSS-REFERENCE TO RELATED APPLICATIONS

This application is the United States national phase of International Application No. PCT/EP2020/078925 filed Oct. 14, 2020, and claims priority to European Patent Application No. 19315128.9 filed Oct. 23, 2019, the disclosures of which are hereby incorporated by reference in their entirety.

FIELD OF THE INVENTION

The present invention relates to an injection device, and in particular, the invention relates to a medical injection device comprising an end-of-dose indicator arranged to inform a user of an end of the injection.

BACKGROUND ART

Injection devices comprising an end-of-dose indicator are known. Such an end-of-dose indicator adopts typically a first position before and during the injection of the substance and a second position at the end of the injection, in order to inform the user that the injection is completed and that the injection device can be removed from the body.

However, a prior-art end-of-dose indicator usually moves from the first to the second position progressively, i.e. as the injection of the substance goes along. Consequently, it may be difficult for a user to see the exact moment at which the injection is completed. In addition, an end-of-dose indicator may also be costly or difficult to manufacture, which may limit its use in an injection device.

PRESENTATION OF THE INVENTION

The present invention aims to address the above-mentioned drawbacks of the prior art, and to propose an injection device comprising an end-of-dose indicator providing a clear signal that the injection is completed. In addition, the injection device is also inexpensive and easy to manufacture.

SUMMARY OF THE INVENTION

To this end, a first aspect of the invention is an injection device for injecting a substance into a body, comprising:
- a case comprising elastic means and being adapted to receive and hold a barrel containing the substance to be injected, the barrel comprising a stopper movable in sliding engagement inside the barrel,
- a plunger unit comprising a triggering portion, the plunger unit being adapted to be coupled to the stopper and movable with regard to the case from an initial, proximal position to a final, distal position to inject the substance when the barrel is provided into the case,
- an end-of-dose indicator accommodated into said case and movable under a force of the elastic means from a hidden position, in which the end-of dose indicator is hidden from a user, to a visible position, in which at least one portion of the end-of-dose indicator is visible to a user,
- hiding means for locking the end-of-dose indicator in the hidden position and configured to be unlocked by the triggering portion of the plunger unit when the plunger unit reaches an indicator position during its injection movement from the initial, proximal position to the final, distal position, so as to allow an automatic movement of the end-of-dose indicator to the visible position.

Thanks to the hiding means, the end-of-dose indicator can pop up in a short, single movement, which provides a clear indication that the injection has been completed. For example, the movement has a length of 1 mm to 1 cm, preferably 2 to 8 mm and again preferably 4 to 6 mm or 5 mm. In addition, the hiding means are directly unlocked by the triggering portion of the plunger unit which allows for a reliable active triggering in an end portion of the injection movement of the plunger unit. Preferably, the plunger unit is configured to move manually, i.e. under a force applied by the user. Alternatively, the plunger unit may move under the force of a spring or a motor.

For example, the indicator position may be between 85% to 100% and preferably 95% to 100% or 97% to 100% of the injection movement of the plunger unit. In other words, the indicator position is in the last portion of the injection movement, immediately before or in the final, distal position of the plunger unit.

Advantageously, the hiding means comprise:
- at least one indicator stop provided on one of the case and the end-of-dose indicator,
- at least one flexible arm provided on the other one of the case and the end-of-dose indicator and arranged to contact the indicator stop in the hidden position of the end-of-dose indicator,
- wherein the flexible arm is configured to be deflected by the triggering portion of the plunger unit for removing the contact with the abutment surface, so as to unlock the hiding means.

Such an end-of-dose indicator and such hiding means are easy to manufacture and provide a reliable triggering. In addition, they prevent undesired triggering for example due to shocks during manufacturing, transportation or operation. Preferably, two flexible arms are provided, preferably on the end-of-dose indicator. Again preferably, two indicator stops are provided on or inside the case.

Advantageously, the triggering portion comprises a rigid leg and the flexible arm comprises a slope forming an angle with the longitudinal axis of the rigid leg. This configuration allows for a smoother unlocking of the hiding means with a minimal feeling of hard point for the user performing the injection. The triggering portion may be one rigid leg and preferably two rigid legs that may protrude from the plunger unit.

Advantageously, the end-of-dose indicator is adapted to move from the hidden position to the visible position in the proximal direction. This movement, opposite to the injection movement allows for an easier perception by the user. For example, the movement may be linear, which allows to simplify the design and manufacturing of the injection device. The movement of the plunger unit is also preferably linear, so as to simplify the manufacturing and operation of the injection device.

Advantageously, the case comprises a window and the at least one portion of the end-of-dose indicator comprises a tab configured to pop up in the window when the end-of-dose indicator moves in the visible position. The window may be covered with a transparent material or may simply comprise an opening in the case. This window is valuable both to check the substance and the barrel before injection but also to protect the movement of the end-of-dose indicator.

Advantageously, the plunger unit comprises a tubular member provided with the triggering portion, wherein the tubular member is adapted to cover at least part of the case in the final, distal position of the plunger unit. This tubular member thus indicates that the injection device has been used when it covers the case and may preferably mask at least a portion or most of the window of the case.

Advantageously, the case comprises a distal ring in which the end-of-dose indicator is accommodated. This allows to accommodate the end-of-dose indicator in a location remote from the barrel and the plunger unit and thus simplifies the manufacturing of the injection device.

Advantageously, the tubular member comprises an end surface and the distal ring defines an abutment surface adapted to contact the end surface in the final, distal position of the plunger unit. Consequently, the injection device is in a "closed" design at the end of the injection, which prevents any reuse and promotes a safe disposal of the used injection device. Alternatively, or in combination, a new barrel may be loaded into the case and another injection may be performed.

Advantageously, at least a portion of the window is arranged on the distal ring. The portion of the end-of-dose indicator may be preferably visible in this portion of the window when the end-of-dose indicator is in the visible position. Consequently, the user may see both the stopper in the distal portion of the barrel and the end-of-dose indicator in the visible position. This also allows the user to see the end-of-dose indicator if the case is covered by the tubular member.

Advantageously, the injection device comprises the barrel held into the case, the barrel containing the substance to be injected and comprising the stopper movable in sliding engagement and an injection needle. For example, the barrel comprises a proximal flange and the barrel is held in the case by the flange.

Advantageously, the injection device further comprises:
a needle shield arranged to be movable under the force of the elastic means, from an injection position in which the needle shield is movable with regard to the injection needle, to a safety position in which the needle shield permanently covers the injection needle, the needle shield being provided with a flexible leg comprising a shield stop,
the case further comprises an operating stop configured to prevent the needle shield to move to the safety position by abutting against the shield stop,
the triggering portion is further configured to deflect the flexible leg of the needle shield when the plunger unit has reached a triggering position during its injection movement, in order to remove the abutment between the shield stop and the operating stop and to allow the needle shield to reach the safety position under the force of the elastic means.

For example, the same rigid leg or another rigid leg of the triggering portion may be configured to perform unlocking of the flexible leg. The needle shield allows to prevent any undesired needle pricking and thus to perform a safe operation and a safe disposal of the injection device.

Advantageously, the indicator position is a threshold position located after the triggering position in the injection movement of the plunger unit. For example, the triggering position may be from 85 to 95% of the injection movement while the indicator position may be from 96 to 100% of the injection movement of the plunger unit.

Advantageously, the injection device further comprises a safety lock arranged for locking the needle shield and/or the shield stop in the safety position of the needle shield. The safety lock may block or limit the movement of the needle shield in the safety position. For example, this safety lock may comprise a safety stop provided on the case and abutting the shield stop in the safety position of the needle shield.

The operating stop of the case may act as a safety stop by limiting a retraction or proximal movement of the needle shield in the safety position. In the safety position of the needle shield, the flexible leg of the needle shield may thus be non-deflected, i.e. in its initial state, in order to allow this abutment. In other words, the triggering portion of the plunger unit may be configured to deflect the flexible leg only when the needle shield is in a retracted, proximal position.

Alternatively, or in combination, the triggering portion or another portion of the plunger unit may provide for a safety lock in the final, distal position of the plunger unit, for example by a direct contact with the needle shield and/or with the flexible leg, which allows to simplify manufacturing of the injection device.

Advantageously, the safety lock comprises at least one flexible tab provided on the case and the triggering portion is further configured to deflect the flexible tab in order to place it in an abutment position with the shield stop when the plunger unit has reached a safety lock position during its injection movement. This contributes to a thin injection device and reliable safety position of the needle shield. Alternatively, the flexible tab may be a rotating tab. This safety lock position may be identical to the triggering position of the plunger unit or closer from the final, distal position of the plunger unit. For example, the triggering position may be from 85 to 90% of the injection movement of the plunger unit and the safety lock position from 90 or 91 to 95 or 96% of the injection movement of the plunger unit.

For example, the triggering portion comprises at least one rigid leg, for example parallel to a longitudinal axis of the injection device, arranged to interact with the flexible leg of the needle shield. Optionally, the triggering portion comprises another rigid leg that may also be longitudinal and is arranged to interact with the flexible tab. For example, the longitudinal rigid legs may have different lengths, i.e. may protrude from the plunger unit at or to a different length, in order to interact with the flexible leg of the needle shield and the flexible tab of the case, in the same threshold position of the plunger unit (i.e. the triggering position) or in two different threshold position (i.e. the triggering position and the safety lock position).

Alternatively or in combination, the triggering portion may comprise abutment surfaces or protrusions provided on the plunger unit. The triggering position may comprise two, three or four rigid legs, the needle shield may comprise two, three of four flexible legs and the case may comprise two, three of four operating stops. Each rigid leg is preferably configured to be aligned with an operating stop and a flexible leg on a longitudinal axis or proximal-distal axis of the injection device. Further, two end-of-dose indicators may be provided, each with two flexible arms. In this case, the triggering portion may preferably comprise two or four another legs, preferably aligned with each flexible arms of each end-of-dose indicator on a longitudinal axis or proximal-distal axis of the injection device.

BRIEF DESCRIPTION OF THE DRAWINGS

Other features and advantages of the present invention will appear more clearly from the following detailed description of particular non-limiting examples of the invention, illustrated by the appended drawings where.

DETAILED DESCRIPTION

The present injection system is intended for administration of a substance such as parenteral drug compositions by a medical caregiver or by a patient with a simplified operation and a clear visible indicator showing when the substance has been fully injected.

As such, in this application, the distal direction must be understood as the direction of injection with reference to the medical injection system, and the proximal direction is the opposite direction, i.e. the direction toward the hand of the medical caregiver or of the patient. In addition, a substance or drug composition must be understood as all kinds of injectable drug composition adapted for therapeutics, aesthetics, preventive or diagnosis applications.

With reference to FIGS. 1 to 5 is shown an injection device according to a preferable embodiment of the present invention, in a ready-to-use state, i.e. as available to the user after release from a blister packaging.

Figure 1:
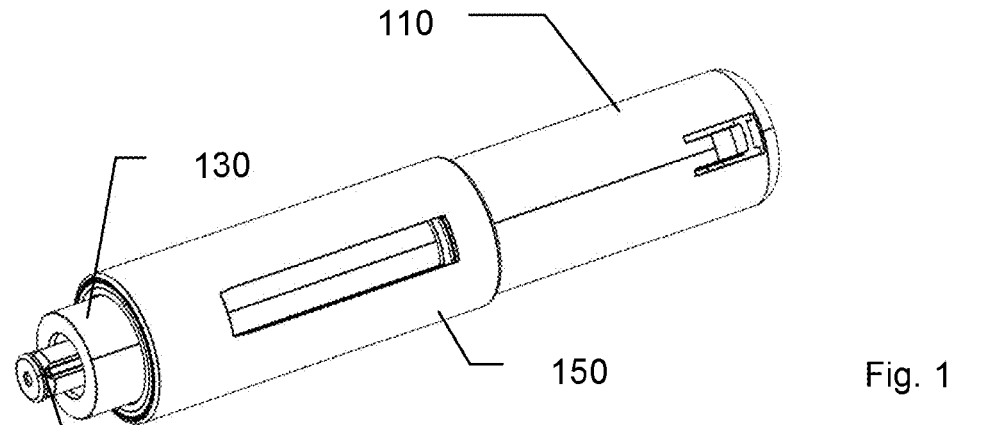
FIG. 1 represents a perspective view of an injection device according to the present invention, as presented during storage or transportation.
Figure 2:
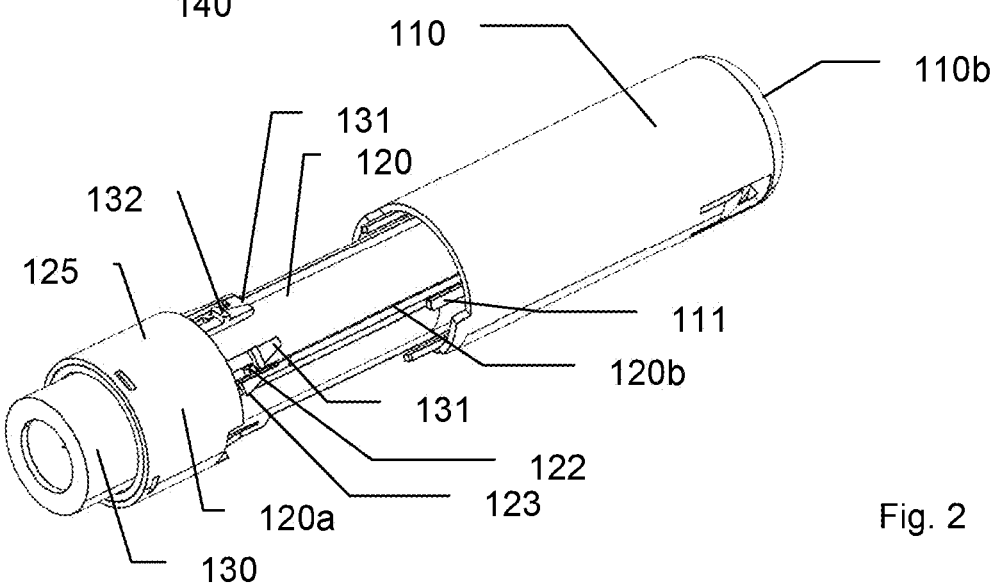
FIG. 2 represents a perspective view of the injection device of FIG. 1, in a ready-to-use state and without the handle.
Figure 3:
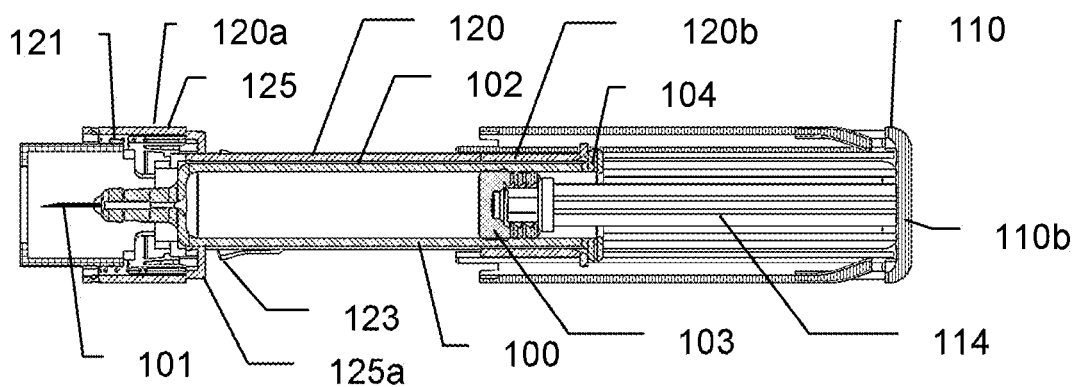
FIG. 3 represents a cross-section view of the injection device according to FIG. 2.
Figure 4:
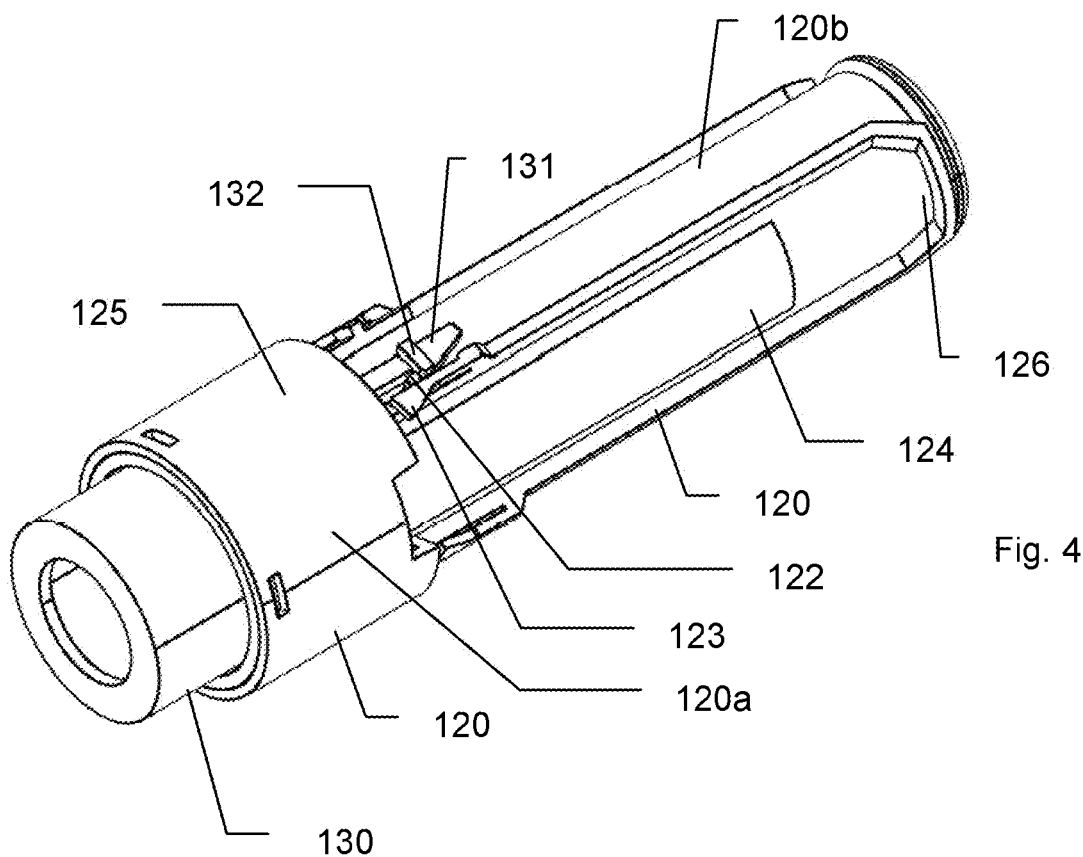
FIG. 4 represents a perspective view of the injection device of FIG. 3, without the plunger unit.

The injection device comprises a case 120, visible in FIGS. 2-4, receiving a syringe 100 having a barrel 102 (only visible in FIG. 3) that contains the substance to be injected. The barrel 102 is provided with a fixed or removable injection needle 101 adapted to prick the patient's body and a stopper 103 in sliding engagement inside the barrel (102), as it is known from the prior art. The barrel 102 further comprises a proximal flange 104 which is held by the case in order for the case to accommodate and secure the barrel 102. The injection needle 101 may be provided with a needle cap 140 covering the injection needle 101 during storage and transportation of the injection device.

The case 120 comprises a distal portion 120a and a proximal portion 120b, the distal portion 120a that may define a distal ring 125 having a width or diameter larger than the proximal portion 120b. The distal ring 125 may comprise an abutment surface 125a facing the proximal direction. The case 120 further comprises elastic means 121, an operating stop 122 and a flexible tab 123. An optional window 124 may give a visual access to the barrel 102 and to the substance it contains.

The case is covered with an optional covering handle 150 (only represented in FIG. 1) intended to cover the case 120 so as to be easily gripped and held by a hand of the user performing the injection. The handle 150 may be fixed or clipped to the case 120 by its distal extremity, i.e. on or close to the distal ring 125. The proximal portion 120b of the case 120 comprises one or two locking recesses 126.

Figure 5:
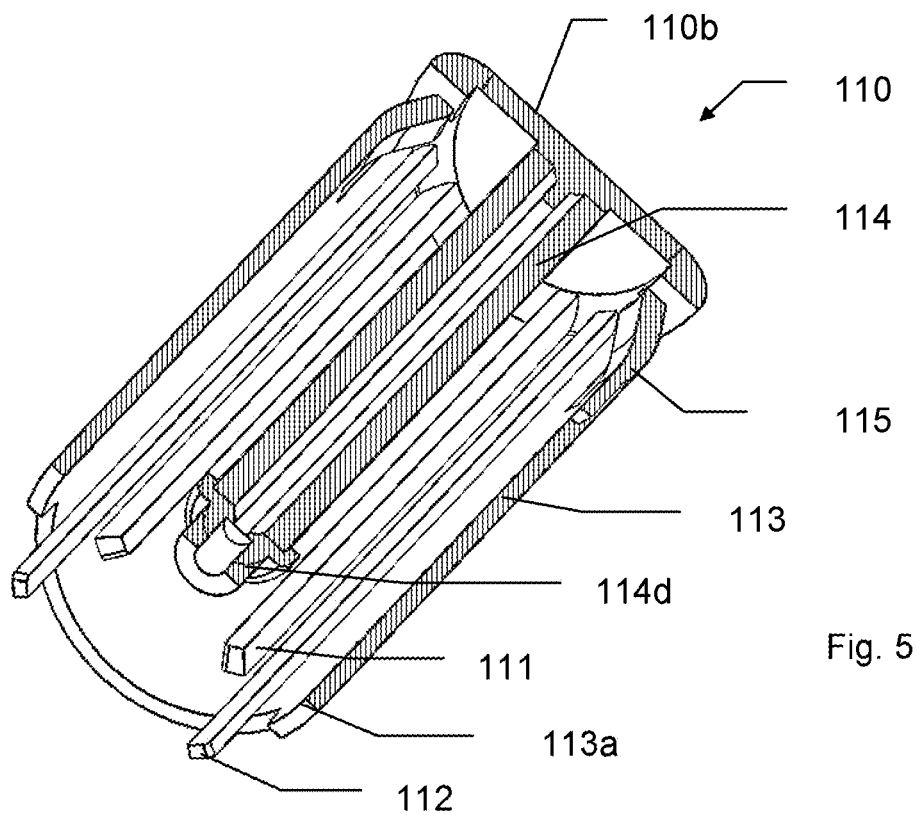
FIG. 5 represents a perspective cross-section view of the plunger unit of the injection device.

A plunger unit 110, more visible with reference to FIGS. 2, 3 and 5, is adapted to slide with regard to the case 120 and to be coupled to the stopper 103 by the distal extremity 114d of a plunger shaft 114. It comprises an external tubular member 113 adapted to cover at least part of the case 120 and to slide between the case 120 and the handle 150. The plunger unit 110 is movable under the manual force applied by a user on a pushing surface 110b, from an initial, proximal position (represented in FIGS. 1-3) to a final, distal position (represented in FIG. 11) to inject the substance into the patient's body.

The plunger unit 110 further comprises a triggering portion in the form of two longitudinal rigid legs 111, 112 having different lengths, wherein the longest rigid leg 112 protrudes distally from the tubular member 113 with regard to shortest rigid leg 111. For example, one or several triggering portions may be provided on the plunger unit 110. In addition, the plunger unit 110 comprises one or two oblique arms 115 protruding proximally from the tubular member 113 and intended to cooperate with the locking recesses 126 in the final, distal position of the plunger unit 110. For example, four triggering portions are provided on the plunger unit 110.

An optional needle shield 130 is accommodated partially in the distal ring 125 of the case 120 and is slidable in view of the case during an injection position in which an injection can be performed (see FIGS. 1-5). In this injection position, the needle shield 130 can move from a deployed position (see FIGS. 1-6) in which the injection needle (101) is covered to a retracted position in which at least part of the injection needle is not covered (see FIG. 7). In addition, the needle shield 130 is arranged to be movable from the injection position to a safety position, distal from the deployed position and in which the needle shield 130 permanently covers the injection needle 101.

The optional needle shield 130 is provided with at least one flexible leg 131 extending proximally and comprising a shield stop 132 such as a protrusion and a proximal slope 132b. Elastic means 121 are provided in the case 120, for example in the distal ring 125 in order to apply a distal force on the needle shield 130. The elastic means can comprise a cylindrical steel spring abutting a surface provided inside the case 120, such as the distal face of the abutment surface 125a.

Figure 6:
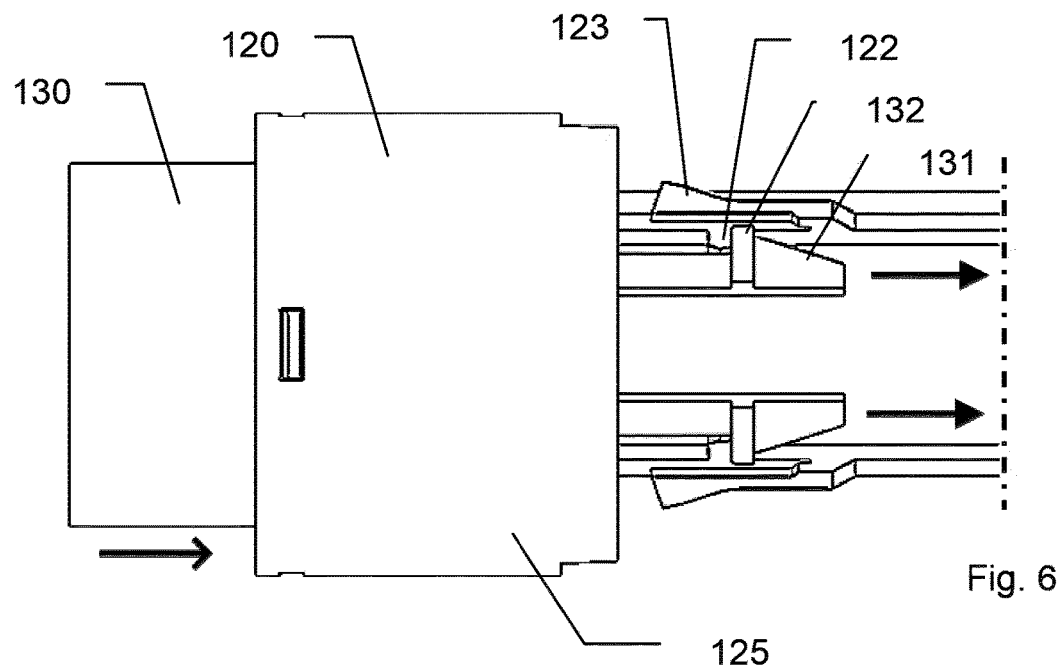
FIG. 6 represents a side view of a distal portion of the injection device of FIG. 2, in a ready-to-use state and a deployed position of the needle shield.

With reference to FIGS. 2 and 4, the case 120 further comprises one operating stop 122 preventing the needle shield 130 to move to the safety position by contacting the shield stop 132 in the deployed position of the needle shield 130, as visible in FIGS. 2-3 and 6. Consequently, in the injection position of the needle shield 130, the shield stop 132 can move from a contact with operating stop 122 to a position proximal to the operating stop 122, when the needle shield 130 moves from the deployed position to the retracted position (see FIGS. 6-7). In the retracted position, the needle shield may be stopped by the elastic means 121. This proximal movement of the needle shield 130 is intended to be performed when the injection device is pressed onto the body with a force greater than the force of the elastic means 121 and as many times as required to complete an injection.

In the figures, two triggering portions, two operating stops and two flexible legs are visible, but one, three of four of them may be provided, in corresponding or aligned positions.

Operation of the Injection Device

In operation, the injection device may be removed from a blister or packaging and the needle cap 140 may be removed from the injection needle 101. At this moment, the injection needle 101 is covered by the needle shield 130, thus avoiding needle fear.

Figure 7:
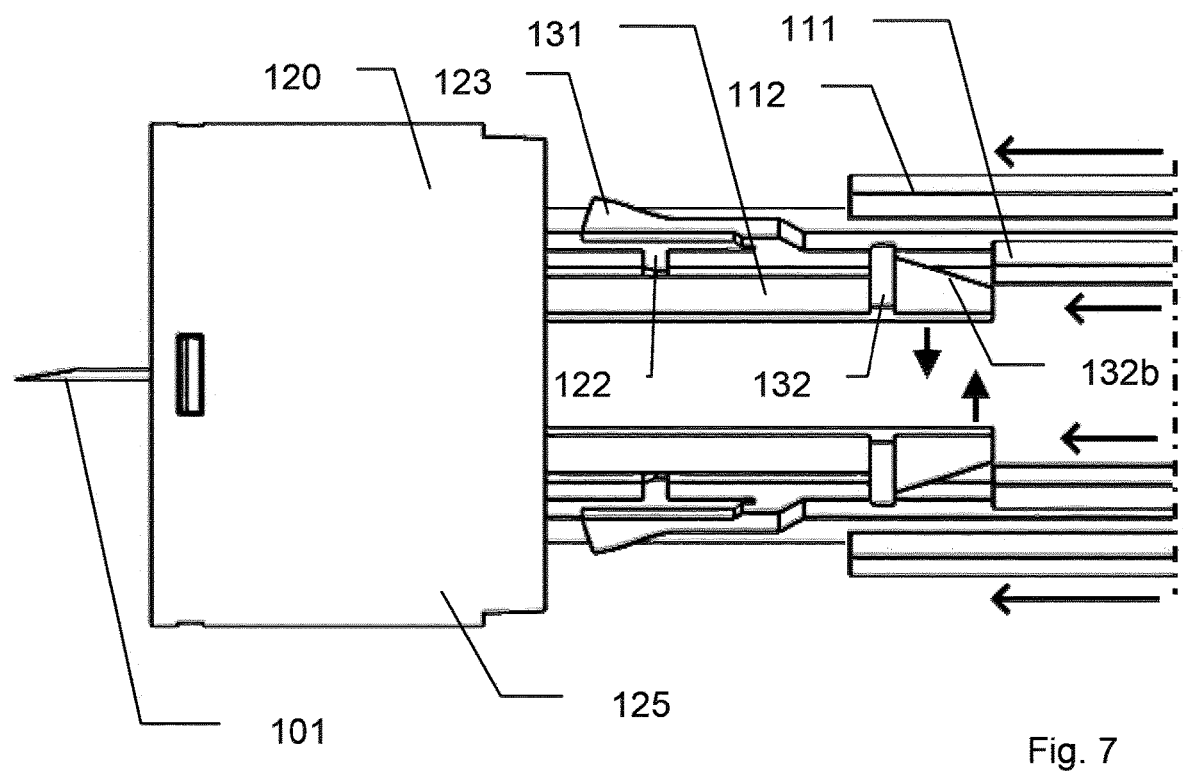
FIG. 7 represents a side view of a distal portion of the injection device of FIG. 2 in a retracted position of the needle shield.

The injection device is then pressed on the body of a patient and the needle shield 130, in the injection position, moves proximally from the deployed position to the retracted position in which the shield stop 132 of the needle shield 130 is not in contact with the operating stop 122 and the needle shield 130 does not cover at least part of the injection needle 101 (see FIGS. 6-7). The injection needle 101 thus penetrates the patient's body and the pricking is performed.

At this point, it is possible that the patient or the user prefers to change the injection site for medical and/or convenience reasons. This change is permitted by the injection device, thanks to the injection position of the needle shield 130. When the injection device is removed from the patient's body before the injection has been completed, the needle shield 130 is pushed from the retracted position to the deployed position by the elastic means 121 but prevented from reaching the safety position by the operating stop 122. Consequently, the injection needle is covered at any time, especially when not inserted into the patient's body and the same operation of pricking can be reproduced at another injection site of the body.

When the patient or the user is satisfied with the injection site, he/she may press the pushing surface 110b of the plunger unit 110, thus moving the stopper 103 distally and performing the injection of the substance into the body. This distal movement of the plunger unit 110 brings the triggering portion (rigid legs 111 and 112) of the plunger unit 110 closer to the flexible leg 131 of the needle shield 130 and the flexible tab 123 of the case 120, as visible in FIG. 7.

Figure 8:
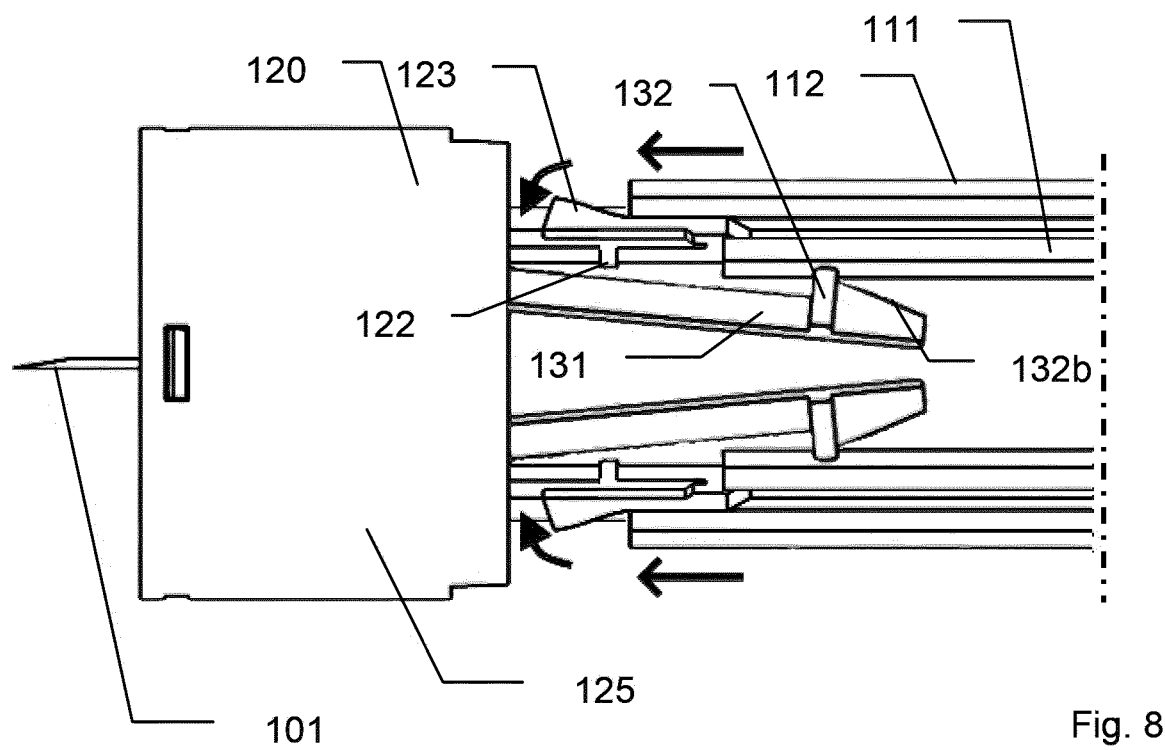
FIG. 8 represents a side view of a distal portion of the injection device of FIG. 2 in the retracted position of the needle shield, wherein the plunger unit has moved distally.

When the plunger unit 110 has reached a first threshold position or triggering position, preferably in an end portion of its injection movement, the shortest rigid leg 111 comes into contact with the proximal extremity and the proximal slope 131b of the flexible leg 131, as visible in FIG. 7. As the plunger unit 110 is moved further in the distal direction to complete the injection, the shortest rigid leg 111 contacts and deflects the flexible leg 131, thanks to its proximal slope 131b, according to the arrows represented in FIG. 7 and as visible in FIG. 8.

Figure 9:
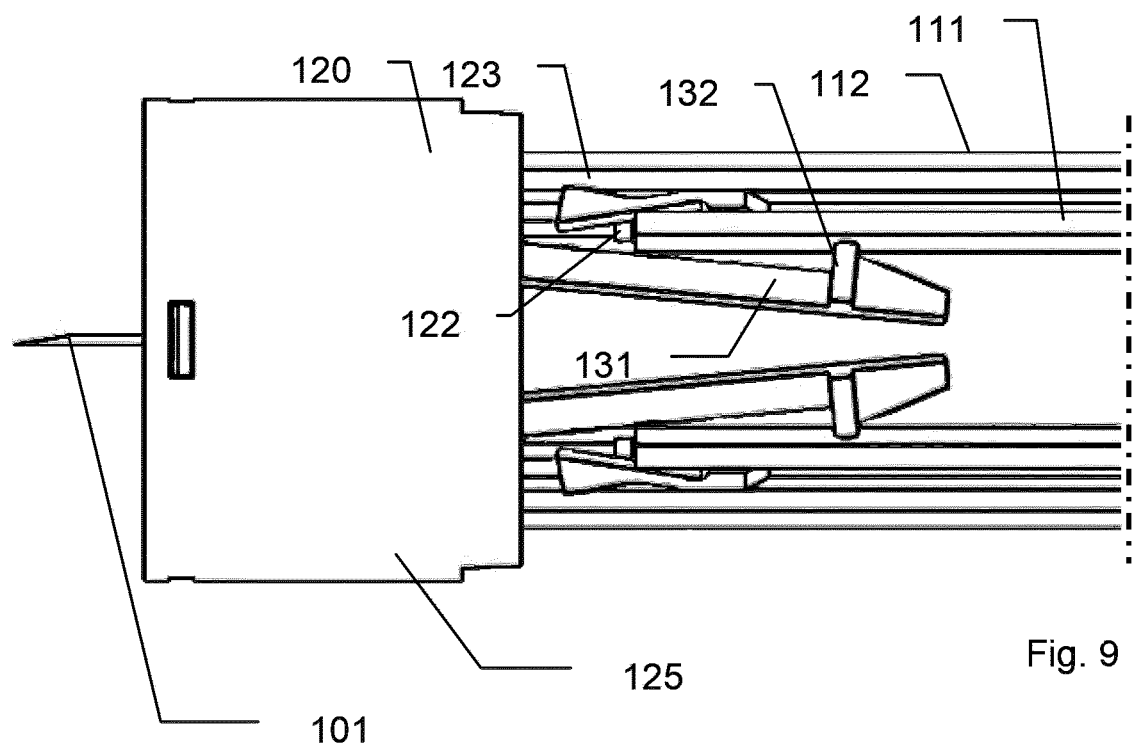
FIG. 9 represents a side view of a distal portion of the injection device of FIG. 2 in the retracted position of the needle shield, wherein the plunger unit is in a final, distal position.

In a safety lock position of the plunger unit 110, which corresponds to the first threshold position or a second threshold position in the injection movement of the plunger unit 110, the longest rigid leg 112 comes into contact with the flexible tab 123. The flexible tab 123 is then moved into a space distal from the operating stop 122, according to the circular arrows of FIG. 8 and as represented in FIG. 9. The plunger unit 110 still moves under the user's force in the distal direction and the shortest rigid leg 111 moves into a space proximal from the operating stop 122 up to abutting the operating stop 122. The flexible leg 131 is maintained in a deflected position and the shortest rigid leg 111 occupies the space previously occupied by the flexible leg 131, as represented in FIG. 9. At the same time, the longest rigid leg 112 moves toward the distal ring 125 and maintains the flexible tab 123 in a deflected position distally from the operating stop 122.

Figure 10:
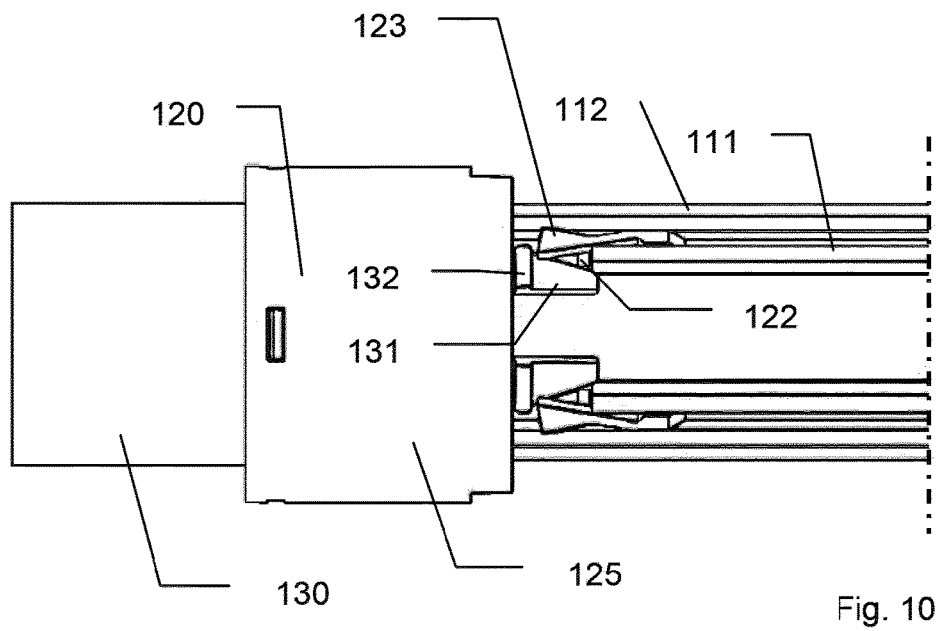
FIG. 10 represents a side view of a distal portion of the injection device of FIG. 2 in a safety position of the needle shield wherein the plunger unit is in a final, distal position.

At the end of the injection, when the plunger unit 110 reaches its final, distal position and all the substance contained in the barrel 102 has been transferred to the body through the injection needle 101, the injection device is as represented in FIGS. 9 and 10, with the shortest rigid leg 111 in abutment on the operating stop 122. Alternatively or in combination, this final position corresponds to a position wherein the stopper 103 abuts the distal end of the barrel 102.

The injection device is then removed from the injection site and the needle shield 130 is pushed distally by the elastic means 121. However, the flexible leg 131 is still deflected by the shortest rigid leg 111 and the shield stop 132 cannot contact the operating stop 122 anymore. When the needle shield moves distally, the shield stop 132 reached the space located distally from the operating stop 122, in which it comes to a stop on the abutment surface 125a of the distal ring 125. Further any proximal movement of the needle shield is blocked by a contact between the shield stop 132 and the flexible tab 123, maintained in the flexible position by the longest rigid leg 112, as visible in FIG. 10.

In FIG. 10, the needle shield is in the safety position covering the whole injection needle 101, so as to avoid any needle pricking, and is prevented from moving proximally by the abutment between the shield stop 132 of the flexible leg 131 and the flexible tab 123 of the case 120. The shortest rigid leg 111 and the longest rigid leg 112 thus act as a triggering portion in order to trigger the safety position of the needle shield 130, by allowing the flexible leg 131 to escape the operating stop 122 and the flexible tab 123 to reach an abutment position in which it can act as a safety lock.

Figure 11:
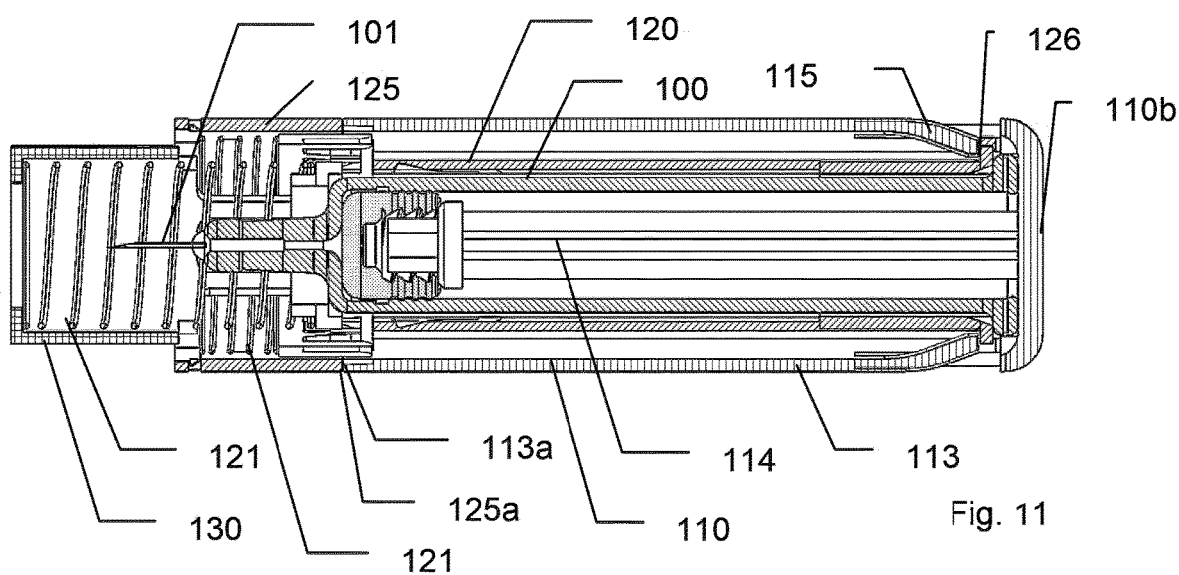
FIG. 11 represents a cross-section side view of the injection device of FIG. 2 in the safety position wherein the plunger unit is in a final, distal position.
Figure 12:
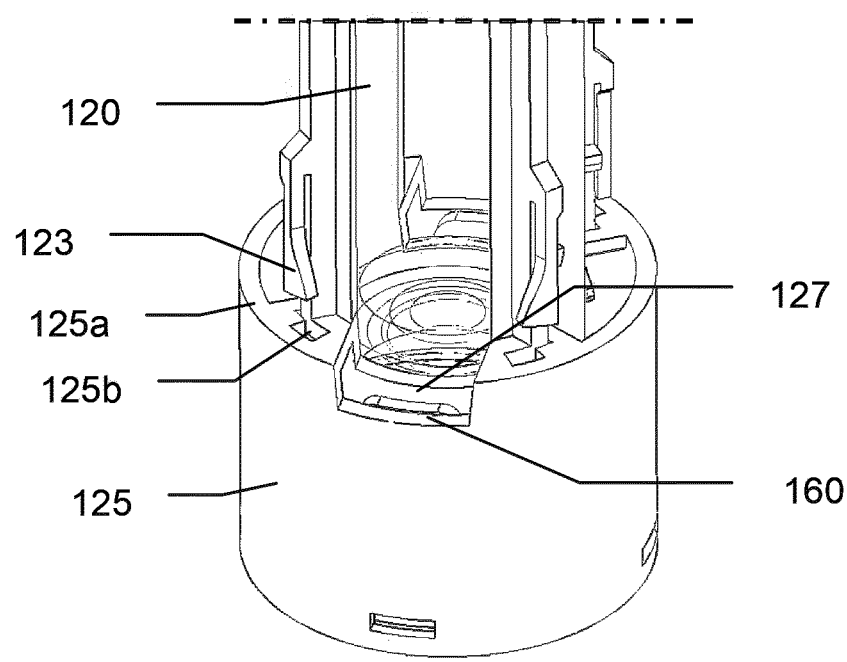
FIG. 12 represents a perspective view of the distal portion of the injection device of FIG. 2 in the ready-to-use position, wherein the needle shield is omitted.

As represented in FIG. 11, in the final distal position of the plunger unit 110, the oblique arm 115 of the plunger unit 110 is engaged with the locking recess 126 of the case 120, and the end surface 113a of the tubular member 113 contacts the abutment surface 125a of the distal ring 125. Consequently, the plunger unit 110 is locked with regard to the case 120, thus preventing any reuse of the injection device and allowing for a safe disposal of the used injection device.

End-of-Dose Indicator

The injection device according to the present invention further comprises an end-of-dose indicator 160, as described with reference to FIGS. 12-16. Please note that neither the plunger shaft 114 nor the needle shield 130 are represented in FIGS. 12-16 for clarity reasons.

The end-of-dose indicator 160 may be located in the distal ring 125 of the case 120 and the distal ring 125 may comprise a triggering opening 125b provided in the abutment surface 125a and aligned axially to receive the longest rigid leg 112 of the plunger unit 110. In addition, the case 120 may also comprise an indicator opening 127 configured to render visible at least part of the end-of-dose indicator 160 after the injection has been completed.

Figure 13:
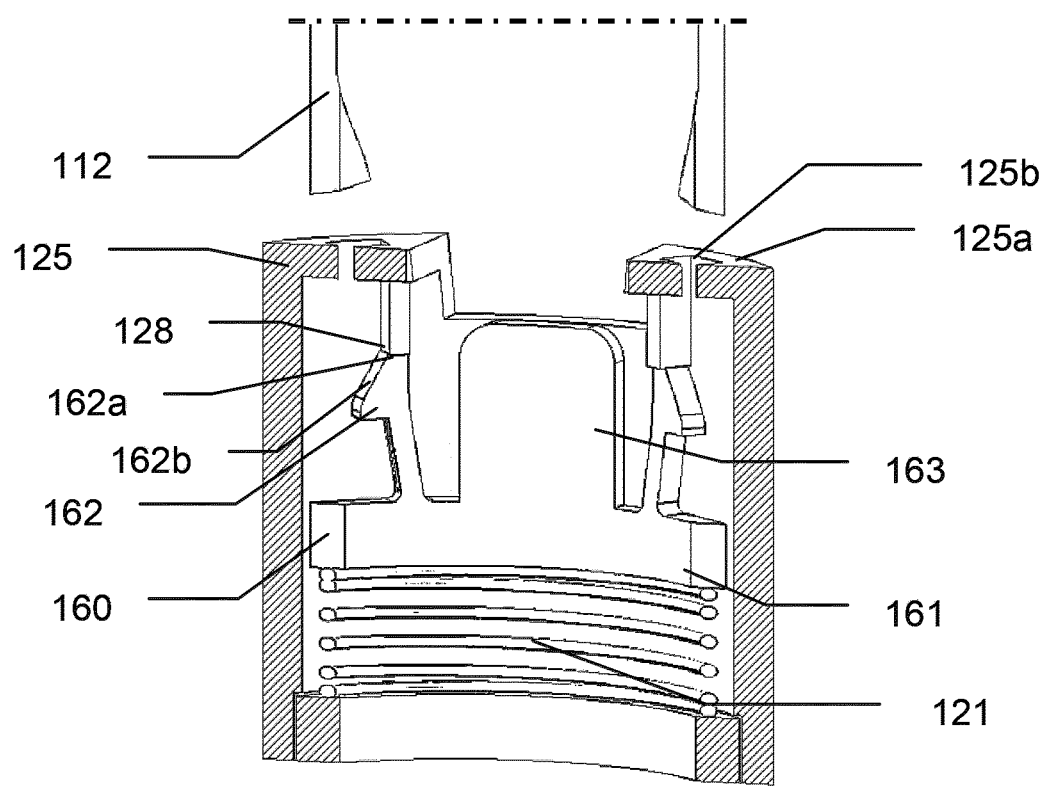
FIG. 13 represents a cross section view of the distal portion of the injection device of FIG. 12, with the end-of-dose indicator shown in the hidden position.

With reference to FIG. 13, the end-of-dose indicator 160 comprises a base 161 in contact with the elastic means 121 in order to receive a proximal force from the elastic means 121. The end-of-dose indicator 160 further comprises at least one and preferably four flexible arms 162 protruding from the base 161 in the proximal direction and each comprising an extremity provided with an abutment portion 162a and a slope 162b.

The end-of-dose indicator 160 is movable from a hidden position in which the end-of-dose indicator 160 is hidden from a user in the case 120, to a visible position in which at least one portion of the end-of-dose indicator such as a tab 163 is visible to a user and/or protrude outside the case 120 and/or through the indicator opening 127. For example, the tab 127 may be a portion of the end-of-dose indicator with a visible color and/or a visible design, such as a red rectangle or a rectangle with a red dot.

The case 120 comprises an indicator stop 128, such as one or two rigid arms pointing in the distal direction, for example inside the distal ring 125. In the ready-to-use state represented in FIGS. 12-13, the abutment portion 162a of each flexible arm 162 is pushed against the indicator stop 128 of the case 120 by the elastic means 121. Consequently, the end-of-dose indicator 160 is blocked in the hidden position by these hiding means. The elastic means may be the same spring as used for the needle shield or another concentric spring abutting an internal abutment surface of the distal ring 125.

Figure 14:
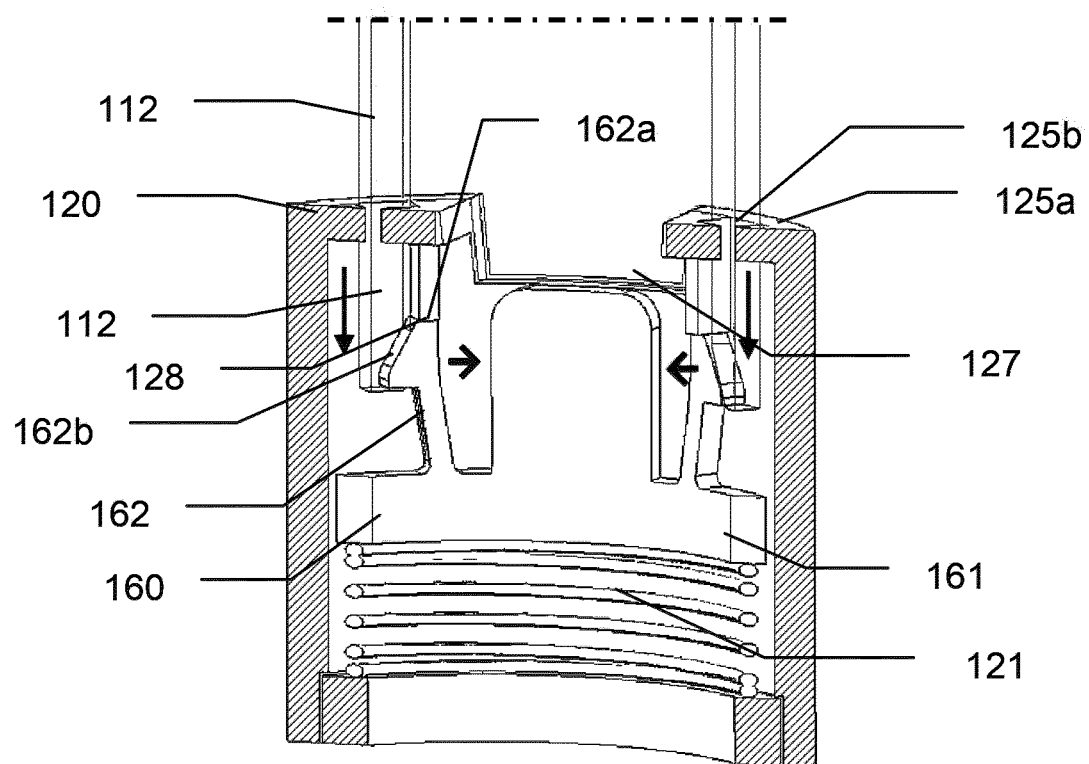
FIG. 14 represents a cross section view of the distal portion of the injection device of FIG. 12 in the final, distal position of the plunger unit, triggering the end of dose indicator.

When the plunger unit 110 moves from the initial, proximal position to the final distal position, the triggering portion such as the longest rigid leg 112 penetrates in the distal ring 125 through the triggering opening 125b, as visible in FIG. 14, in which the longest rigid leg 112 is shown as transparent. When the plunger unit has reached an indicator position, which may be the second threshold position or a third threshold position, the longest rigid leg 112 comes in contact with the slope 162b of the flexible arm 162 and the flexible arm is thus deflected toward the tab 163. The contact between the abutment portion 162a of the flexible arm 162 and the indicator stop 128 is thus removed and these hiding means are deactivated or unlocked, as represented in FIG. 15.

Figure 15:
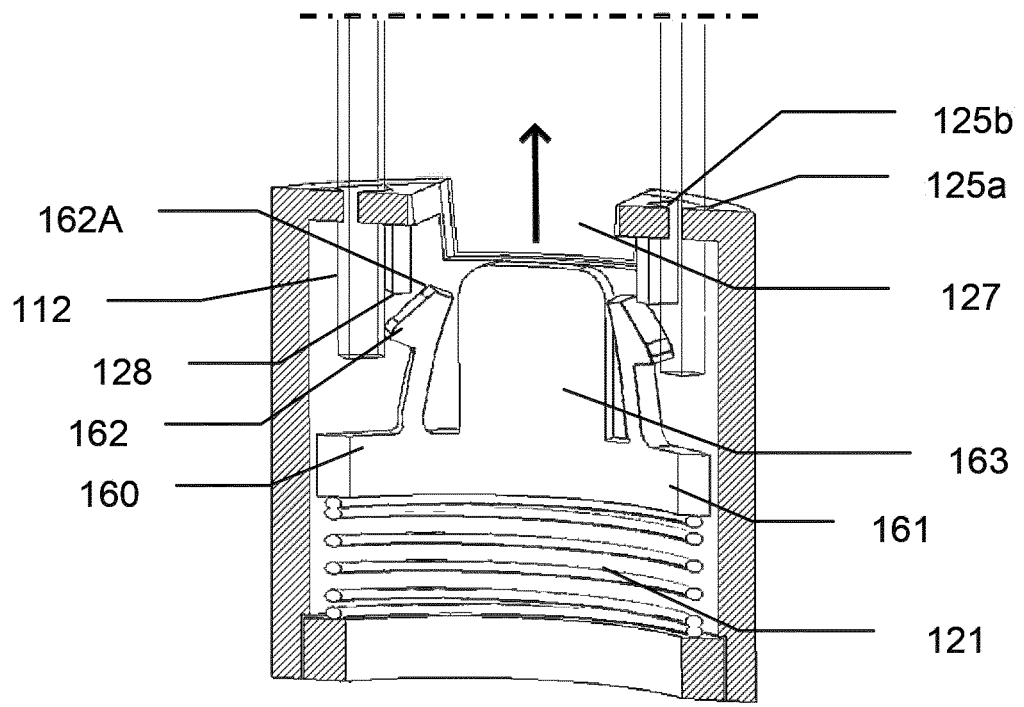
FIG. 15 represents a cross section view of the distal portion of the injection device of FIG. 12 in the final, distal position of the plunger unit, after the end-of-dose indicator has been triggered.
Figure 16:
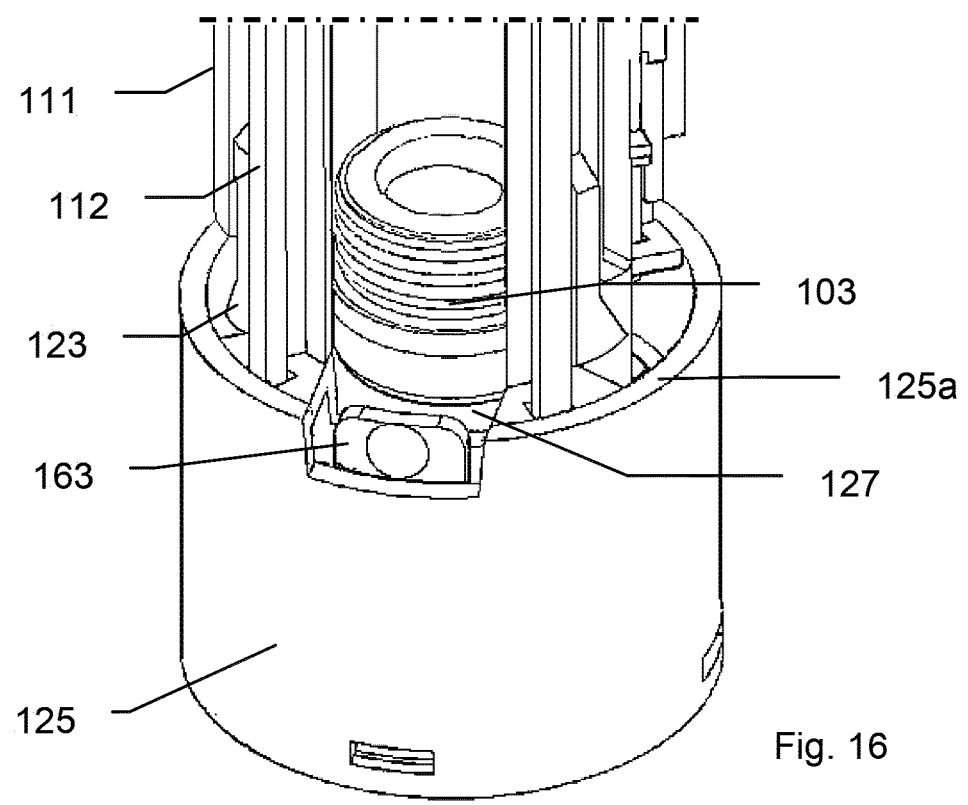
FIG. 16 represents a cross section view of the distal portion of the injection device of FIG. 12 in the final, distal position of the plunger unit, with the end-of-dose indicator in a visible position.

With reference to FIG. 15, the end-of-dose indicator 160 is free to move to the visible position and the tab 163 may pop up into the indicator opening 127, as visible in FIG. 16 by the user. Thanks to the quick trigger of the hiding means and the immediate movement of the end-of-dose indicator 160 in the visible position, the user and/or the patient is informed that the substance has been fully injected without any ambiguity.

OTHER FEATURES AND ALTERNATIVES

It is, of course, understood that obvious improvements and/or modifications for one skilled in the art may be implemented, still being under the scope of the invention as it is defined by the appended claims.

For example, the elastic means are not limited to one or two cylindrical springs but may also comprise any form of spring or elastic means. The external surface of the tubular member may have an ergonomic relief and may comprise overmoulded surfaces in smooth material. The shield stop 132 may have another design than a protrusion, such as a cavity or a groove.

The materials intended to build such an injection device are polypropylene, polycarbonate and/or acrylonitrile-butadiene-styrene. The barrel may comprise glass or plastic. Colour may be provided on various parts of the injection device, in particular on the tab of the end-of-dose indicator. The window may be provided with graduation or indicator.

The invention claimed is:

1. An injection device for injecting a substance into a body, comprising:
   a case comprising elastic means and being adapted to receive and hold a barrel containing the substance to be injected, the barrel comprising a stopper moveable in sliding engagement inside the barrel;
   a plunger unit comprising a triggering portion, the plunger unit being adapted to be coupled to the stopper and moveable with regard to the case from an initial, proximal position to a final, distal position to inject the substance when the barrel is provided into the case;
   an end-of-dose indicator accommodated into said case and moveable under an expansion force of the elastic means from a hidden position in which the end-of dose indicator is hidden from a user to a visible position in which at least one portion of the end-of-dose indicator is visible to a user; and
   hiding means for locking the end-of-dose indicator in the hidden position and configured to be unlocked by the triggering portion of the plunger unit when the plunger unit reaches an indicator position during its injection movement, so as to allow an automatic movement of the end-of-dose indicator to the visible position, wherein the hiding means comprise:
      at least one indicator stop provided on one of the case and the end-of-dose indicator; and
      at least one flexible arm provided on the other one of the case and the end-of-dose indicator and arranged to contact the at least one indicator stop in the hidden position of the end-of-dose indicator,
      wherein the at least one flexible arm is configured to be deflected by the triggering portion of the plunger unit for removing contact of an abutment portion of the at least one flexible arm with the at least one indicator stop, so as to unlock the hiding means.

2. The injection device according to claim 1, wherein the triggering portion comprises a rigid leg and the flexible arm comprises a slope forming an angle with the longitudinal axis of the rigid leg.

3. The injection device according to claim 1, wherein the end-of-dose indicator is adapted to move from the hidden position to the visible position in the proximal direction.

4. The injection device according to claim 1, wherein the case comprises a window and wherein the at least one portion of the end-of-dose indicator comprises a tab configured to pop up in the window when the end-of-dose indicator moves in the visible position.

5. The injection device according to claim 1, wherein the plunger unit comprises a tubular member provided with the triggering portion, wherein the tubular member is adapted to cover at least a part of the case in the final, distal position of the plunger unit.

6. The injection device according to claim 1, wherein the case comprises a proximal portion and a distal portion defining a distal ring in which the end-of-dose indicator is accommodated.

7. The injection device according to claim 5, wherein the tubular member comprises an end surface, and wherein the case includes a distal ring that defines an abutment surface adapted to abut the end surface of the tubular member in the final, distal position of the plunger unit.

8. The injection device according to claim 4, wherein at least a portion of the window is arranged on a distal portion of the case.

9. An injection device for injecting a substance into a body, comprising:
- a case comprising elastic means and being adapted to receive and hold a barrel containing the substance to be injected, the barrel comprising a stopper moveable in sliding engagement inside the barrel;
- a plunger unit comprising a triggering portion, the plunger unit being adapted to be coupled to the stopper and moveable with regard to the case from an initial, proximal position to a final, distal position to inject the substance when the barrel is provided into the case;
- an end-of-dose indicator accommodated into said case and moveable under an expansion force of the elastic means from a hidden position in which the end-of dose indicator is hidden from a user to a visible position in which at least one portion of the end-of-dose indicator is visible to a user; and
- hiding means for locking the end-of-dose indicator in the hidden position and configured to be unlocked by the triggering portion of the plunger unit when the plunger unit reaches an indicator position during its injection movement, so as to allow an automatic movement of the end-of-dose indicator to the visible position,
- wherein the barrel is held in the case, the barrel containing the substance to be injected and comprising the stopper moveable in sliding engagement and an injection needle; and
- the injection device further comprises a needle shield arranged to be moveable under the force of the elastic means from an injection position in which the needle shield is moveable with regard to the injection needle to a safety position in which the needle shield permanently covers the injection needle, the needle shield being provided with a flexible leg comprising a shield stop,
- wherein the case further comprises an operating stop configured to prevent the needle shield to move to the safety position by abutting against the shield stop, and
- wherein the triggering portion is further configured to deflect the flexible leg of the needle shield when the plunger unit has reached a triggering position during its injection movement, in order to remove the abutment between the shield stop and the operating stop and to allow the needle shield to reach the safety position under the force of the elastic means.

10. The injection device according to claim 9, wherein the indicator position is a threshold position located after the triggering position in the injection movement of the plunger unit.

11. The injection device according to claim 9, further comprising a safety lock arranged for locking the needle shield and/or the shield stop in the safety position of the needle shield.

12. The injection device according to claim 11, wherein the safety lock comprises at least one flexible tab provided on the case and the triggering portion is further configured to deflect the at least one flexible tab into an abutment position with the shield stop when the plunger unit has reached a safety lock position during its injection movement.

13. The injection device according to claim 5, wherein the case comprises a proximal portion and a distal portion, and wherein the tubular member receives the proximal portion within an interior of the tubular member in the final, distal position of the plunger unit.

14. The injection device according to claim 6, wherein the distal ring has a width or diameter larger than the proximal portion.

15. The injection device according to claim 6, wherein the distal ring includes at least one triggering opening that receives the triggering portion of the plunger unit therethrough to unlock the end-of-dose indicator.

* * * * *